US011953007B2

(12) United States Patent
Krampe et al.

(10) Patent No.: US 11,953,007 B2
(45) Date of Patent: Apr. 9, 2024

(54) ROTARY LOBE PUMP WITH INTERNAL BEARING

(71) Applicant: VOGELSANG GMBH & CO. KG, Essen (DE)

(72) Inventors: Paul Krampe, Essen (DE); Henrik Ahrens, Essen (DE)

(73) Assignee: VOGELSANG GMBH & CO KG, Essen (DE)

(*) Notice: Subject to any disclaimer, the term of this patent is extended or adjusted under 35 U.S.C. 154(b) by 0 days.

(21) Appl. No.: 17/312,426

(22) PCT Filed: Dec. 13, 2019

(86) PCT No.: PCT/EP2019/085094
§ 371 (c)(1),
(2) Date: Jun. 10, 2021

(87) PCT Pub. No.: WO2020/120746
PCT Pub. Date: Jun. 18, 2020

(65) Prior Publication Data

US 2022/0025883 A1 Jan. 27, 2022

(30) Foreign Application Priority Data

Dec. 13, 2018 (DE) ..................... 20 2018 107 141.6

(51) Int. Cl.
*F04C 2/12* (2006.01)
*F04C 2/08* (2006.01)
*F04C 15/00* (2006.01)

(52) U.S. Cl.
CPC .............. *F04C 2/126* (2013.01); *F04C 2/084* (2013.01); *F04C 15/0038* (2013.01);
(Continued)

(58) Field of Classification Search
CPC ...... F04C 2/126; F04C 2/084; F04C 15/0038; F04C 15/0061; F04C 15/008;
(Continued)

(56) References Cited

U.S. PATENT DOCUMENTS 2,848,952 A 8/1958 Wakeman
4,940,394 A * 7/1990 Gibbons ............... F04C 13/002
417/283

(Continued)

FOREIGN PATENT DOCUMENTS

CN 107429694 12/2017
DE 2002518 7/1971

(Continued)

*Primary Examiner* — Dominick L Plakkoottam
*Assistant Examiner* — Paul W Thiede
(74) *Attorney, Agent, or Firm* — PRICE HENEVELD LLP

(57) ABSTRACT

A rotary lobe pump having a pump housing with a pump room, an inlet opening and an outlet opening, a first multi-lobe rotary piston, which is arranged in the pump room and is rotatably mounted about a first axis of rotation, a second multi-lobe rotary piston, which is arranged in the pump room and is rotatably mounted about a second axis of rotation spaced apart from the first axis of rotation and meshingly engages in the first rotary piston, wherein the first and second rotary pistons are drivable in opposite directions and are designed to generate a flow of a conveyed medium from the inlet opening through the pump room to the outlet opening by counter-rotation about the first and second axis of rotation, respectively, and a drive device, which is mechanically coupled to the rotary pistons for driving the rotary pistons.

9 Claims, 8 Drawing Sheets

(52) U.S. Cl.
CPC ........ *F04C 15/0061* (2013.01); *F04C 15/008* (2013.01); *F04C 2240/20* (2013.01); *F04C 2240/50* (2013.01); *F04C 2240/52* (2013.01); *F04C 2240/805* (2013.01); *F05B 2240/50* (2013.01)

(58) Field of Classification Search
CPC .............. F04C 2240/20; F04C 2240/50; F04C 2240/52; F04C 2240/805; F05B 2240/50
See application file for complete search history.

(56) References Cited

U.S. PATENT DOCUMENTS

| | | | | | |
|---|---|---|---|---|---|
| 5,295,798 | A * | 3/1994 | Maruyama | F04D 19/046 | 415/168.2 |
| 5,599,176 | A * | 2/1997 | Reinersmann | F04C 18/16 | 417/420 |
| 5,695,327 | A * | 12/1997 | Heinen | F01C 21/10 | 418/201.1 |
| 9,804,607 | B1 * | 10/2017 | Coleman | F28F 21/065 | |
| 2002/0057979 | A1 | 5/2002 | Schofield et al. | | |
| 2002/0159906 | A1 * | 10/2002 | Phallen | F04C 2/086 | 418/132 |
| 2008/0118383 | A1 * | 5/2008 | Park | F04C 18/126 | 418/9 |
| 2015/0275893 | A1 * | 10/2015 | Krampe | F04C 2/12 | 417/410.4 |
| 2017/0045046 | A1 | 2/2017 | Afshari | | |
| 2018/0058452 | A1 | 3/2018 | Yuki et al. | | |
| 2018/0128522 | A1 * | 5/2018 | Hauleitner | F25B 31/004 | |

FOREIGN PATENT DOCUMENTS

| | | |
|---|---|---|
| DE | 20052518 | 7/1971 |
| DE | 2520667 | 11/1976 |
| DE | 3427282 | 1/1986 |
| DE | 29723984 | 9/1999 |
| DE | 202010011626 | 10/2010 |
| DE | 202010015437 | 2/2012 |
| EP | 1061259 | 12/2000 |
| EP | 1519044 | 3/2005 |
| EP | 2475889 | 7/2012 |
| EP | 2475889 | 5/2017 |
| FR | 1110645 | 2/1956 |
| JP | S495704 | 1/1974 |
| JP | H03213688 | 9/1991 |
| JP | H07279868 | 10/1995 |
| JP | H08284855 | 10/1996 |
| JP | 2013507575 | 3/2013 |
| JP | 2015535045 | 12/2015 |
| JP | 2018-189018 | 11/2018 |
| WO | 2011049362 | 4/2011 |
| WO | 2014067988 | 5/2014 |
| WO | 2015083195 | 6/2015 |
| WO | 2016157445 | 10/2016 |

* cited by examiner

ROTARY LOBE PUMP WITH INTERNAL BEARING

CROSS-REFERENCE TO FOREIGN PRIORITY APPLICATION

The present application claims the benefit under 35 U.S.C. §§ 119(b), 119(e), 120, and/or 365(c) of PCT/EP2019/085094 filed Dec. 13, 2019, which claims priority to German Application No. 20 2018 107 141.6 filed Dec. 13, 2018.

FIELD OF THE INVENTION

The invention relates to a rotary lobe pump for conveying a particle-laden conveyed medium, comprising a pump housing with a pump room, an inlet opening and an outlet opening, a first multi-lobe rotary piston, which is arranged in the pump room and is rotatably mounted about a first axis of rotation, a second multi-lobe rotary piston, which is arranged in the pump room and is rotatably mounted about a second axis of rotation spaced apart from the first axis of rotation and meshingly engages in the first rotary piston, wherein the first and second rotary pistons are drivable in opposite directions and are designed to generate a flow of the conveyed medium from the inlet opening through the pump room to the outlet opening by counter-rotation about the first and second axis of rotation, respectively, and a drive device, which is mechanically coupled to the rotary pistons for driving the rotary pistons. The invention further relates to a sleeve for a rotary lobe pump. The invention also relates to a method for servicing a rotary lobe pump.

BACKGROUND OF THE INVENTION

Rotary lobe pumps of the aforementioned design are used to pump liquids, in particular, particle-laden liquids. Liquids with varying or fluctuating solid contents can be pumped. Rotary lobe pumps are characterised in that they can reliably fulfil their function even with higher solid contents. In addition, rotary lobe pumps of this type are suitable for pumping both low and high viscosity liquids. Such pumps are typically used in agricultural technology or sewage technology, among others. Rotary lobe pumps are known, for example, from DE2002518A1, DE3427282A1, DE29723984U1, EP1519044B1, DE202010011626U1, EP2475889B1, WO2014/067988A2 and U.S. Pat. No. 2,848,952.

Rotary lobe pumps of the type according to the invention have a ball passage of at least 1 cm, preferably at least 2 cm, 5 cm, or even at least 7.5 cm. This means that spherical solid particles with a diameter of up to a maximum of 1 cm, 2 cm, 5 cm, or 7.5 cm can be conveyed through the pump room from the inlet to the outlet opening without jamming the moving components of the rotary lobe pump.

A fundamental problem that arises with such rotary lobe pumps is due to the fact that the replacement of wearing parts is associated with a relatively high effort, which has a negative effect on the maintenance costs and can also lead to longer downtimes of the rotary lobe pumps. From EP1519044B1 a rotary lobe pump is known which is accessible from one side, whereby the accessibility of the wearing parts is improved compared to conventional rotary lobe pumps. However, with this design, the executable length of the rotary piston is severely limited, since the drive shaft, which is connected to the rotary piston, is only mounted on one side of the rotary piston and therefore cannot be of any length.

From DE202010015437U1 a rotary lobe pump with hollow rotary piston is known. This offers the advantage that the rotary pistons can be more easily removed from and reinserted into the pump room, because the hollow rotary pistons can be guided axially onto the connection to the drive shaft. In particular, these rotary pistons can be inserted into the pump housing one after the other, as the drive shafts can be designed shorter than the rotary pistons. However, a disadvantage of such a rotary lobe pump is that wearing parts, such as the bearings and seals, cannot be replaced as easily as the rotary pistons.

Another general problem is that such pumps have a relatively high weight and are relatively large due to their design, which is negative in particular for the mobile use of such pumps, for example when used in or on vehicles.

It is, therefore, the task of the invention to provide a rotary lobe pump for conveying a particle-laden conveyed medium, which reduces or eliminates one or more of the disadvantages mentioned. In particular, it is the task of the invention to provide a solution in which the design of the rotary lobe pump is maintenance-friendly without reducing the load capacity of the pump.

SUMMARY OF THE INVENTION

According to the invention, this task is solved by a rotary lobe pump with the features of claim 1. The rotary lobe pump described at the beginning is characterised by a first fixed axle body, which is connected to the pump housing and which is arranged inside the first rotary piston, and at least one first bearing for rotatably bearing the first rotary piston about the first fixed axle body, wherein the bearing is arranged on an outer surface of the first fixed axle body and inside the first rotary piston.

The pump room is understood to be the pump room in which the rotary pistons are located and through which the conveyed medium is conveyed. The conveyed medium flows preferably via a pipe through the inlet opening into the pump room. There, the conveyed medium is conveyed towards the outlet opening by rotating the rotary pistons. The conveyed medium then flows through the outlet opening, preferably into a pipe connected to the outlet opening. Thereby, the rotary pistons are mounted to rotate about an axis of rotation. The first axis of rotation is defined as a virtual line running along the axis of rotation of the first rotary piston. The second axis of rotation is defined as a virtual line running along the axis of rotation of the second rotary piston. The multi-lobe rotary pistons preferably comprise at least two piston lobes, wherein by lobes or piston lobes is meant the displacement lobes of the rotary pistons. The lobes of the rotary pistons are in meshing engagement with each other. A drive device is mechanically coupled with the rotary pistons and drives the rotary pistons. For example, both rotary pistons can be driven individually by means of two electric motors or by means of two hydraulic motors. Alternatively, only one rotary piston can be driven by the drive device and the second rotary piston is driven by the meshing engagement with the first rotary piston. In this way, both rotary pistons can be driven directly, thereby providing each rotary piston with its required power directly, or one rotary piston can be driven directly and the other rotary piston indirectly via this rotary piston. The drive device can preferably comprise an electric or a hydraulic motor. The drive device can also be formed by a drive flange which can be coupled to a shaft output, for example, in order to drive the pump via a power take-off of a tractor or other vehicle. It is further possible that, for example, a drive device drives two shafts via a gearbox, wherein one shaft is coupled to the first rotary piston and another shaft is coupled to the second rotary piston. With all the drive options mentioned, synchronisation of the rotary pistons can be achieved.

The fixed axle body refers to a preferably rotationally symmetrical element that is connected to the pump housing. Thereby, the connection to the pump housing can be carried out by form closure, material closure, or force closure, for example, by means of a screw connection, or a combination thereof. The material closure fastening allows for a secure centring of the axle body on the pump housing and an exact axial alignment, which can be realised with the concept according to the invention, because the axle body, contrary to known solutions, does not have to be dismountable. The force closure also achieves—with increased manufacturing effort—such a good and fault-tolerant centring and additionally provides the option of replacing the axle body. The first fixed axle body extends along the first axis of rotation inside the first rotary piston. Thereby, preferably at least one bearing is arranged on the first fixed axle body. The bearing enables a rotatable mounting of the rotary piston about the first fixed axle body. The bearing is arranged inside the first rotary piston, in particular between the first end face and the second end face of the rotary piston.

The present invention offers the advantage that a very compact design can be achieved due to the location of the bearing inside the rotary pistons. Since there is no need for a bearing in or next to the pump housing, installation space is saved. Furthermore, the drive shaft does not have to be supported, as the bearing can be placed on the fixed axle body directly in the rotary pistons. Thereby, the pump is not limited in its load capacity compared to conventional rotary lobe pumps. This means that lighter and more compact rotary lobe pumps can be manufactured, which is in particular advantageous for mobile applications.

Furthermore, the invention has the advantage that larger chamber lengths can be realised than is the case with rotary lobe pumps with conventional bearing positions. Due to the internal bearing, any and optimal bearing points can be realised, as the position of the bearing is not limited to the ends of the rotatable parts.

According to a first preferred embodiment, it is provided that the first fixed axle body extends along the first axis of rotation, the first rotary piston extends from a first end face of the piston in axial direction to a second end along the first axis of rotation, and the first bearing is arranged axially with respect to the first axis of rotation between the first and second end face of the piston.

The fixed axle body can be designed in different lengths. For example, the axle body can be designed as a hollow cylinder or as a cylinder made of solid material. In the case of the design as a hollow cylinder, preferably a drive shaft can run through the fixed axle body. Preferably, the virtual axis of rotation of the fixed axle body runs on the first axis of rotation. Axial with respect to the first axis of rotation means along or in the direction of the virtual line defining the axis of rotation. The first bearing is preferably arranged inside the first rotary piston. The bearing is therefore preferably arranged between the two end faces of the first rotary piston.

According to a further preferred embodiment, the first bearing is designed as a rolling bearing. In this embodiment, a rolling bearing is used as first bearing to support the first rotary piston rotatably about the first axis of rotation.

A further preferred embodiment is characterised in that a second bearing, preferably designed as rolling bearing, is provided for rotatably supporting the first rotary piston about the first axis of rotation, wherein the second bearing is arranged on the outer surface of the first fixed axle body and inside the first rotary piston. Thereby, the second bearing is arranged on the fixed axle body and rotatably supports the first rotary piston about the first axis of rotation.

Another preferred embodiment is characterised by a second fixed axle body connected to the pump housing and arranged inside the second rotary piston, and at least one bearing for rotatably supporting the second rotary piston about the second axis of rotation, wherein the second bearing is arranged on the outer surface of the second fixed axle body and inside the second rotary piston.

In this embodiment, the two fixed axle bodies are arranged in such a way that the first fixed axle body extends at least partially inside the first rotary piston and the second fixed axle body extends at least partially inside the second rotary piston.

It is further preferred that the first drive device comprises a first drive unit and a second drive unit and that the first rotary piston is directly coupled to the first drive unit and the second rotary piston is directly coupled to the second drive unit. In this context, direct coupling of the drive units to the rotary pistons means that substantially no torque is transferred from the first rotary piston to the second rotary piston or from the second rotary piston to the first rotary piston. The drive units may be, for example, electric motors or hydraulic motors. The drive devices can be synchronised so that the rotary pistons are driven equally. The drive devices can both be arranged on one side of the pump housing. This offers a maintenance advantage. In this way, access to the components located inside the pump room and access to the pump room can be easily managed. The terms pump room and pump chamber can be used interchangeably. For example, an opening in the pump housing that can be closed with a lid can be opened to access the pump room and/or the components in the pump room. This offers significant advantages in terms of maintenance of the rotary lobe pump. Alternatively, the drive devices can be arranged on opposite sides of the pump housing. This type of arrangement offers the advantage that larger drives can be used, as more space is available for each drive device.

Still further, it is preferred that the first and the second rotary piston each have a number of N lobes, wherein N is greater than or equal to two, and the lobes of the first and second rotary piston extend helically along the circumferential surface of the rotary piston and thereby sweep an angle of at least 180° divided by N, preferably 240° divided by N, further preferably 300° divided by N, and preferably 360° divided by N.

This twisted geometry of the lobes of the rotary pistons offers the advantage that the rotary lobe pump can be operated without pulsation. Among other things, this reduces the load on the rotary lobe pump and the components of the rotary lobe pump.

It is further preferred that the first and the second rotary piston each have a number of N lobes, wherein N is preferably less than or equal to eight, less than or equal to six, or less than or equal to four. The number of lobes is, therefore, a maximum of eight in this preferred embodiment.

A further embodiment is characterised by a first seal for sealing from the first and/or the second bearing to the pump room, arranged between the first fixed axle body and the first rotary piston inside the rotary piston, wherein the first seal is preferably designed as a dynamic seal, in particular, as a sliding seal, particularly preferably as an axial or radial seal, for example, as an axial face seal or as a rotary shaft seal.

The bearings that rotatably support the first rotary piston are preferably sealed against the space inside the pump housing by means of a dynamic seal.

It is further preferred that the first seal for sealing from the first and/or the second bearing to the pump room is arranged at a first end of the bearings and is designed as a dynamic seal, in particular, as a sliding seal, particularly preferably as a rotary shaft seal, and a second seal for sealing from the first and/or the second bearing to the pump room is arranged at a second end of the bearings and is designed as a static seal, particularly preferably as an O-ring.

It is particularly advantageous that a dynamic seal only has to be used on one side of the bearing and a static bearing can be used on the other side of the bearing. This offers the advantage that the static seal can be much more robust and durable than a dynamic seal. Thus, an additional advantage is that wearing parts need to be replaced less frequently.

Still further preferred is that the first and/or the second bearing and the first seal are arranged inside a sleeve, wherein the sleeve is connected to the first and/or the second bearing, the sleeve inside the first rotary piston is detachably, preferably by force closure, connected to the rotary piston to rotate with the rotary piston.

The sleeve is preferably connected to the first and/or second bearing and to the first seal. The first and/or second bearing and the first seal are preferably arranged between the first end and the second end of the sleeve. The sleeve can be connected to the rotary piston. This is possible, for example, in such a way that the sleeve or a part of the sleeve can be spread. Preferably, a connection by force closure between the sleeve and the first rotary piston can then be established by spreading the sleeve.

A further preferred embodiment is characterised by a clamping device which is connected to the sleeve and is adjustable between an operating state and a release state, preferably by means of at least one screw connection, wherein in the operating preferably a force closure connection between the sleeve and the first rotary piston is present and in the release state the sleeve and the first rotary piston are movable relative to one another.

The clamping device can, for example, be designed integral with the sleeve or be detachably connected to the sleeve. In particular, the clamping device can also be non-detachably connected to the sleeve. Preferably, the clamping device is adjustable by means of at least one screw, so that a connection between the sleeve and the first rotary piston can be established. The connection between the sleeve and the rotary piston can, for example, be force closure and/or form closure. In the operating state, there is a connection between the sleeve and the first rotary piston. On the other hand, in the release state, relative movements between the sleeve and the rotary piston are possible.

It is further preferred if the clamping device has a tool engagement for relatively moving the clamping device and the sleeve in respect to the rotary piston. The tool engagement allows the clamping device to be connected to a tool, so that by means of a tool, which is connected to the clamping device, preferably via the tool engagement, the clamping device can be moved relatively along the axis of rotation.

In a further embodiment, it is preferred that the clamping device and the sleeve rest against a shoulder of the rotary piston inside the rotary piston and are releasably clamped against the shoulder, wherein the distance between the sleeve and the shoulder is adjustable, preferably by means of at least one screw connection of the clamping device, particularly preferably designed as at least one grub screw. Such a shoulder within the bore of the rotary piston enables a defined positioning of the components, which are arranged within the rotary piston. Thus, by means of a shoulder, precisely defined positions of the bearings and/or the sleeve and/or the seal or seals can be achieved.

It is further preferred that a washer is arranged between the sleeve and the shoulder of the rotary piston for adjusting the axial position of the first rotary piston relative to the sleeve. By means of a washer it is possible to adjust a defined position of the rotary piston in relation to the first fixed axle body and thus in relation to the pump room. Preferably, it is also possible to exchange this sleeve in order to adjust the position of the rotary piston in relation to the pump room.

A further preferred embodiment is characterised by a third fixed axle body connected to the pump housing and arranged inside the first rotary piston, and at least one bearing for rotatably supporting the first rotary piston about the first axis of rotation, wherein the bearing is arranged on the outer surface of the third fixed axle body and inside the first rotary piston.

In this embodiment, the first rotary piston is mounted around two fixed axle bodies. Thereby, the fixed axle bodies can, for example, both be designed as hollow cylinders, or one as a hollow cylinder and one made of solid material. With two axle bodies per rotary piston, even greater lengths of the rotary pistons can be realised, since also with long rotary pistons a sufficiently small bearing distance can be produced.

A further preferred embodiment is characterised by a fourth fixed axle body connected to the pump housing and arranged inside the second rotary piston, and at least one bearing for rotatably supporting the second rotary piston about the second axis of rotation, wherein the bearing is arranged on the outer surface of the fourth fixed axle body and inside the second rotary piston.

Even further is preferred that a hydraulic motor, preferably designed as a radial piston motor or toothed ring motor, is arranged inside the first rotary piston to drive the rotary piston.

In this embodiment, the hydraulic motor that drives the first rotary piston is arranged inside the pump housing. In particular, the hydraulic motor is arranged at least for the most part inside the first rotary piston. This design allows the rotary lobe pump to be made even more compact.

Further it is preferred that the hydraulic motor comprises a rotor rotatable about the first axis of rotation and mechanically coupled to the rotary piston inside the first rotary piston for driving the rotary piston, the hydraulic motor has a stator, which is arranged inside the rotor and connected to or integrally designed with the first fixed axle body, and an inlet and an outlet are connected to the hydraulic motor and extend inside the first fixed axle body and preferably to outside the pump housing.

The rotor of the hydraulic motor is thereby preferably arranged outside the stator. The stator is preferably arranged inside the rotor. Furthermore, the rotor is preferably connected to the first rotary piston by means of a shaft-hub connection.

A further preferred embodiment is characterised in that the drive device for driving the rotary pistons drives two drive shafts coupled via a synchronisation gear, wherein a first drive shaft is mechanically coupled to the first rotary piston and a second drive shaft is mechanically coupled to the second rotary piston, and the synchronisation gear preferably has a spur gear or a toothed belt, in particular, a double toothed belt, for synchronously driving the drive shafts. In this embodiment, two drive shafts are driven via a gearbox, wherein preferably one of the drive shafts drives one of the rotary pistons in each case. The drive shafts are connected to the rotary pistons, for example, via a shaft-hub connection, in order to transmit a torque to them. The synchronisation gear is preferably designed in such a way that it drives the two drive shafts so that they rotate in opposite direction at the same rotational speed.

Further an embodiment is characterised by a shaft-hub connection, for transmitting a torque, which connects the first drive shaft and the first rotary piston in a torque-proof manner and is arranged inside the first rotary piston, wherein preferably the shaft-hub connection is connected to an internal thread inside the rotary piston. Thereby, particularly preferably, an internal thread is arranged within the first rotary piston, into which a screw is screwed, which is connected to the first drive shaft in order to transmit a torque from the drive shaft to the first rotary piston. Thereby, preferably, a clamping sleeve for transmitting a torque from the first drive shaft to the first rotary piston is connected to the screw.

Even further it is preferred that a second drive device is mechanically coupled to the second rotary piston for driving the second rotary piston. Thereby, the drive device is preferably connected to the rotary piston by means of a shaft-hub connection in order to transmit a torque from the second drive device, preferably via a drive shaft, to the second rotary piston.

Even further it is preferred that the first drive device and the second drive device are arranged on opposite sides of the pump housing. This type of arrangement offers the advantage that larger drives can be used, as more space is available for each drive device.

According to a further aspect of the present invention, the above-mentioned problem is solved by a servicing method comprising: Releasing a detachable, preferably force closure connection between a sleeve and a rotary piston, which are rotatably arranged in a pump room, wherein the sleeve is arranged inside the rotary piston, and axially pulling the sleeve out of the rotary piston, wherein at least one bearing and one seal are connected to the sleeve in such a way that they are moved axially out of the rotary piston with the sleeve when the sleeve is pulled out.

Thereby, the connection between the sleeve and the rotary piston can preferably be made by force closure and/or by form closure, for example, by means of a spreadable part through which the connection can be made and which is preferably located on the sleeve. Axially pulling of the sleeve from the rotary piston means that the sleeve is guided out of the rotary piston in the direction of the virtual axis of rotation of the rotary piston. For further advantages, embodiment variants and embodiment details of these further aspects and their possible further embodiments, reference is also made to the previously given description regarding the corresponding features and further embodiments of the rotary lobe pump.

BRIEF DESCRIPTION OF THE DRAWINGS

Preferred embodiments of the invention are explained by way of example with reference to the accompanying figures. They show.

DETAILED DESCRIPTION OF THE EMBODIMENTS

In the figures, identical or essentially functionally identical or similar elements are designated with the same reference signs.

Figure 1:
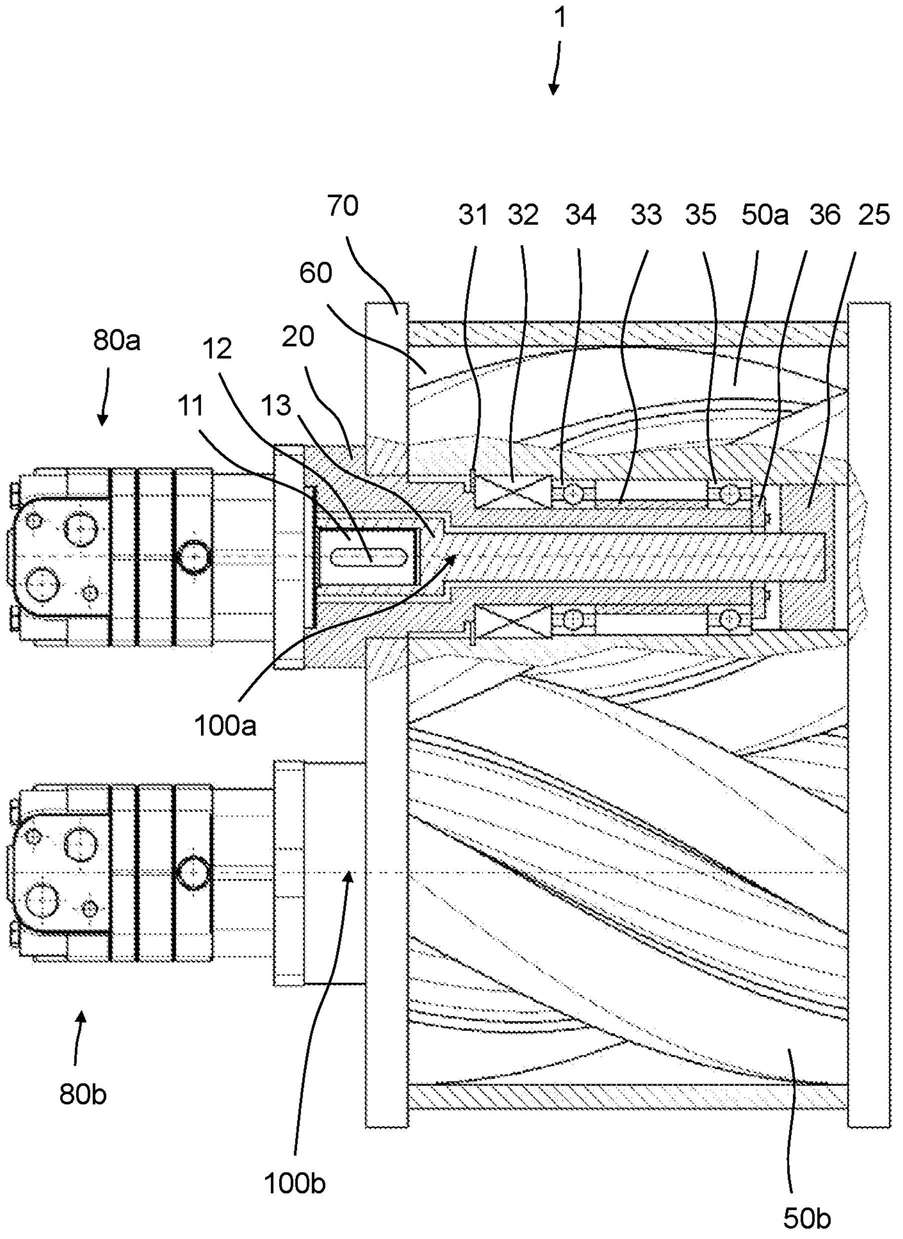
FIG. 1 is a side view of a first embodiment, shown with a partial section through the first axis of rotation in the area of the first rotary piston.

FIG. 1 shows a rotary lobe pump 1 comprising a pump housing 70, wherein the pump housing 70 encloses the pump room 60. Two drive devices 80*a*, 80*b* are arranged on one side of the pump housing. The first drive device 80*a* is connected to the first fixed axle body 20. The fixed axle body 20 is connected to the pump housing 70. The drive device 80*a* has a shaft 11, which is connected by means of a shaft-hub connection 12 to the drive shaft 13, which extends through the fixed axle body 20 along the first axis of rotation 100*a*. The drive shaft 13 is thereby connected to the first rotary piston 50*a* by means of a shaft-hub connection 25 and thus transmits a torque from the first drive device 80*a* to the first rotary piston 50*a*. The second rotary piston 50*b* is similarly driven by the second drive device 80*b*, which drives a second drive shaft (not shown) that is mechanically coupled to the second rotary piston 50*b* and rotates about the second axis of rotation 100*b*. The first rotary piston 50*a* and the second rotary piston 50*b* each have a plurality of twisted lobes. The two rotary pistons 50*a*, 50*b* engage with each other in a meshed manner. The first rotary piston 50*a* is rotatably mounted about the axis of rotation 100*a* by means of a first bearing 34 and a second bearing 35, which are arranged on the first fixed axle body 20 by means of a spacer sleeve 33. In addition to the first bearing 34, a dynamic seal 32 is arranged on the first fixed axle body 20 to seal the bearings against the pump room 60. The seal 32 is thereby axially fixed by a retaining ring 31, which is arranged inside the first rotary piston 50*a*. The second bearing 35, which is arranged at the end of the first fixed axle body, is fixed by means of a fastening device 36. The fastening device 36 is thereby detachably connected to both the second bearing 35 and the first fixed axle body 20.

Figure 2:
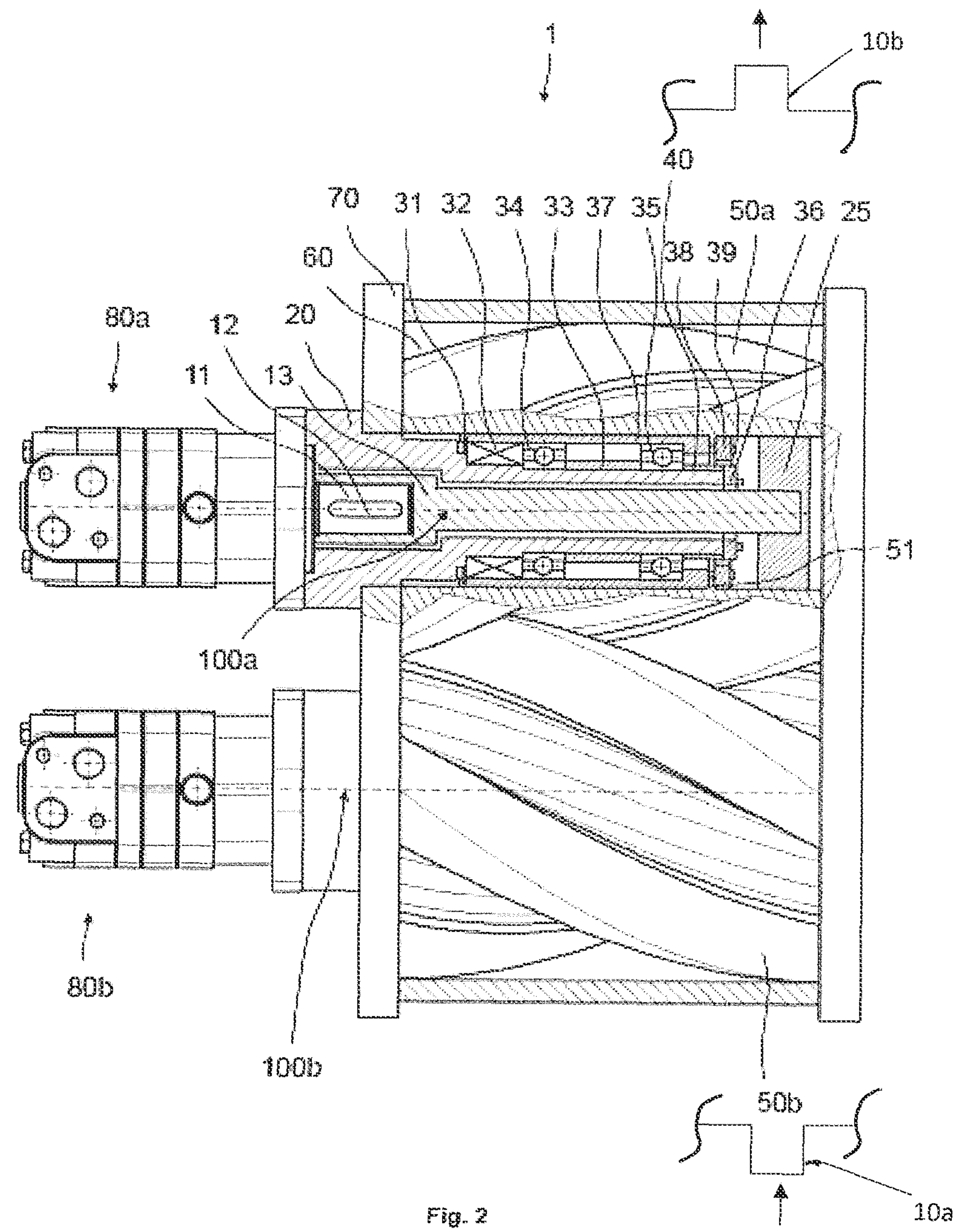
FIG. 2 is a side view of a second embodiment with a sleeve, shown with a partial section through the first axis of rotation in the area of the first rotary piston.

FIG. 2 shows a rotary lobe pump 1 in which two drive devices 80*a*, 80*b* drive two rotary pistons 50*a*, 50*b* which are located in a pump room 60 having an inlet opening 10*a* and an outlet opening 10_b_, wherein the pump room 60 is arranged in a pump housing 70. The rotary pistons 50_a_, 50_b_ are rotatably mounted about the axes of rotation 100_a_ and 100_b_ respectively. A dynamic seal 32, a first bearing 34, a spacer sleeve 33, a second bearing 35, and a second spacer sleeve 40 are arranged on the first fixed axle body 20. The position of the bearings 34, 35 on the fixed axle body 20 is fixed by means of a fixing device 36, which fixes the second spacer sleeve 40 on the fixed axle body 20. A sleeve 37 is arranged on the outer rings of the bearings 34, 35 so that the bearings are inside the sleeve. A retaining ring 31, which is mounted in the sleeve 33, secures the position of the dynamic seal 32 in the axial direction. The sleeve 33 is also arranged on a shoulder 51 of the bore of the first rotary piston 50_a_ and is clamped against this shoulder 51 by a clamping device 38, which is arranged on the other side of the shoulder 51 than the sleeve 37. The clamping device 38 can establish a detachable connection between the sleeve 37, the shoulder 51, and the clamping device 38 by means of a screw connection 39.

Figure 3:
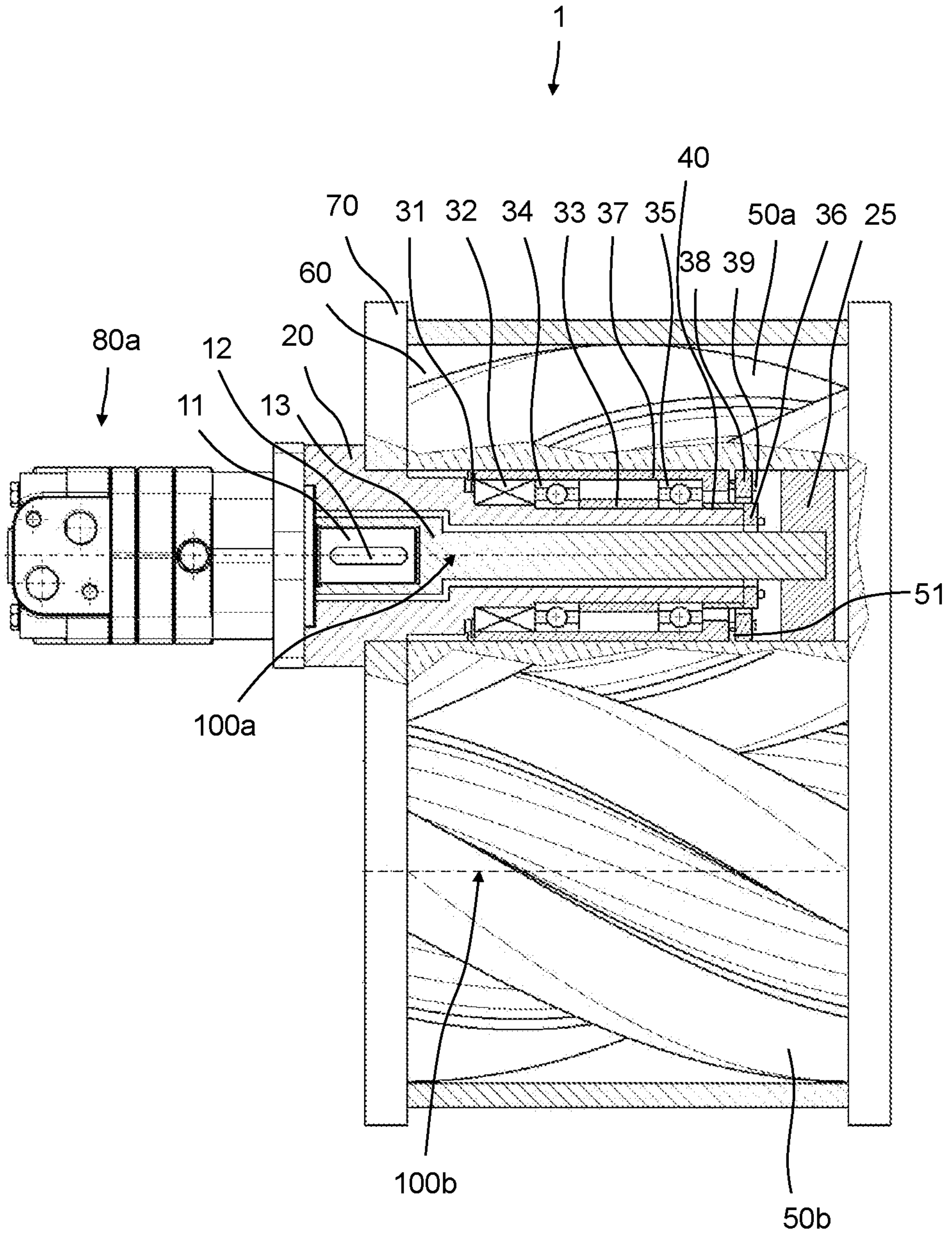
FIG. 3 is a side view of a third embodiment with a drive device, shown with a partial section through the first axis of rotation in the area of the first rotary piston.

FIG. 3 shows a rotary lobe pump 1 with only one drive device 80_a_. The drive shaft 13, which rotates about the axis of rotation 100_a_, is driven via the drive device 80_a_. The drive shaft 13 drives the first rotary piston 50_a_ via a shaft-hub connection 25. The second rotary piston 50_b_ is driven by the first rotary piston 50_a_, which meshes with the second rotary piston 50_b_. The synchronisation of the rotary pistons 50_a_, 50_b_ takes place via the engagement of the two rotary pistons. The bearing of the first rotary piston 50_a_ corresponds here essentially to the bearing of the embodiment shown in FIG. 2.

Figure 4:
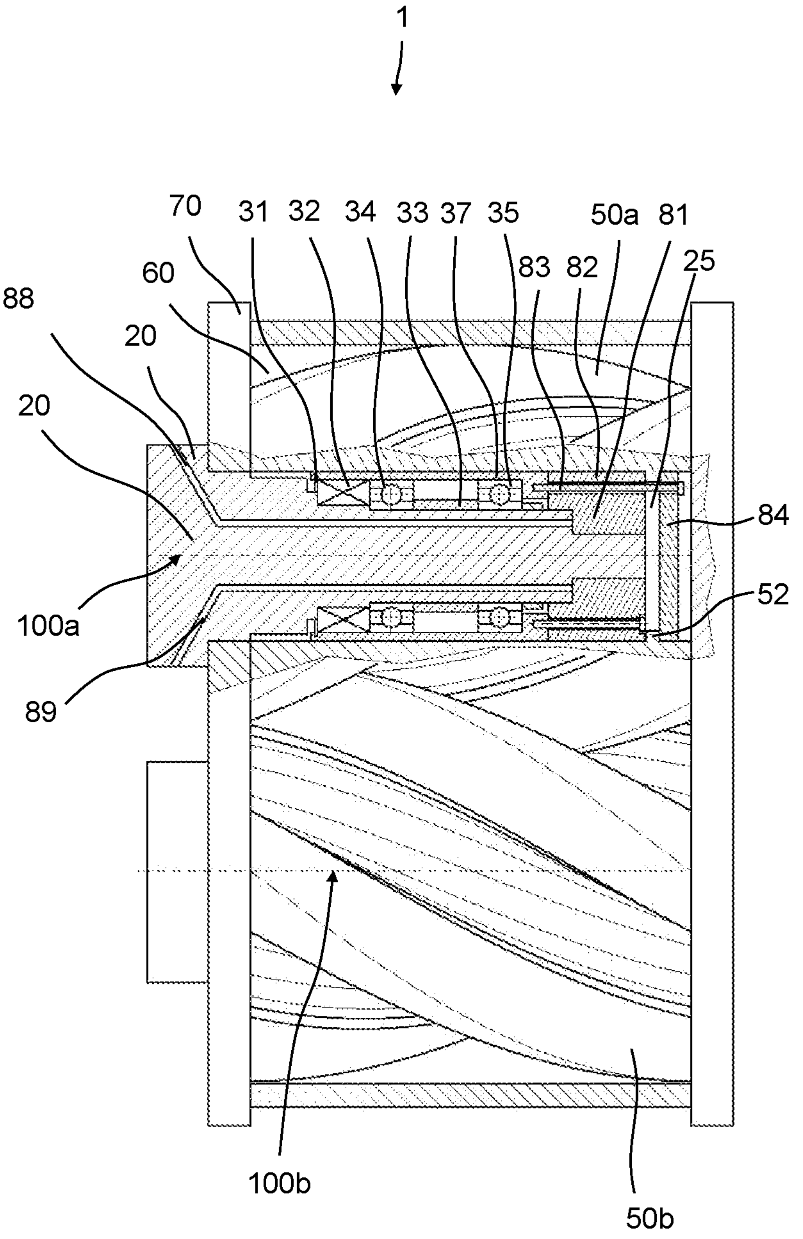
FIG. 4 is a side view of a fourth embodiment with a hydraulic motor arranged inside the first rotary piston, shown with a partial section through the first axis of rotation in the area of the first rotary piston.

FIG. 4 shows a rotary lobe pump 1 that is driven by a hydraulic motor. The hydraulic motor is thereby arranged inside the first rotary piston 50_a_. The hydraulic motor has a stator 81 which is arranged on the fixed axle body 20 and inside the first rotary piston 50_a_. The fixed axle body 20 is configured as a solid material component, wherein a hydraulic inflow conduit 88 and a hydraulic outflow conduit 89 extend through the fixed axle body 20. The inflow conduit 88 and the outflow conduit 89 extend through the fixed axle body 20 out of the pump housing 70 and can be connected outside the rotary lobe pump 1. When the direction of rotation is reversed, the inflow conduit 88 and the outflow conduit 89 are reversed. The rotor 82 rotates about the first axis of rotation 100_a_ and is connected to the first rotary piston 50_a_ to transmit torque to the rotary piston. The rotor 82 is connected by means of a screw connection 83 to the sleeve 37, which, in turn, is connected to the first rotary piston 50_a_. The screw connection 83 also connects a connecting part 84 to the rotor 82, wherein the rotor 82 and the connecting part 84 are clamped from different sides against a shoulder 52 of the bore within the first rotary piston 50_a_. Thereby, the positions of the connecting part 84 and the rotor 82 as well as the sleeve 37 connected thereto with the bearing arranged therein are determined, so that they positions are axially fixed.

Figure 5:
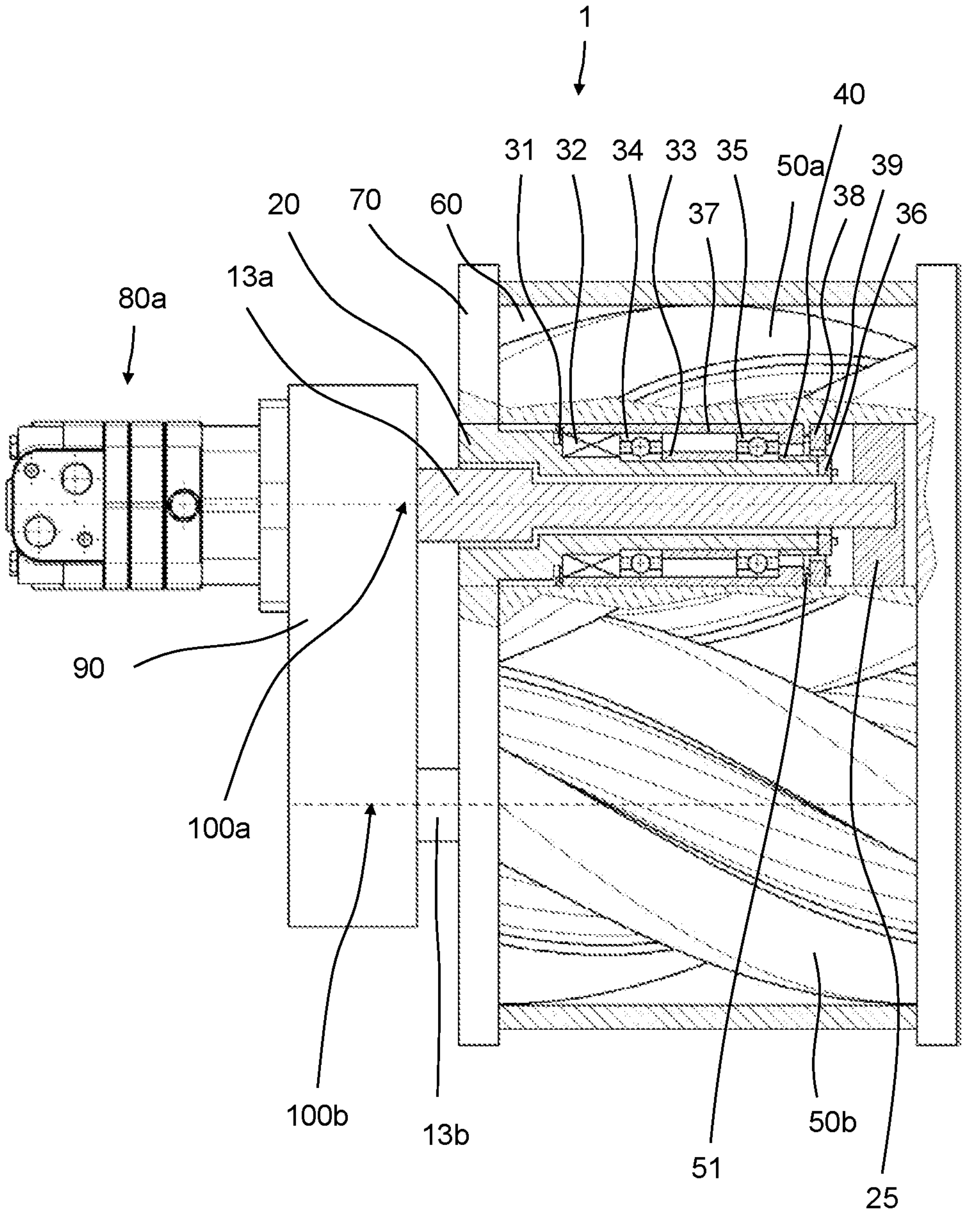
FIG. 5 is a side view of a fifth embodiment with a synchronisation gear, shown with a partial section through the first axis of rotation in the area of the first rotary piston.

FIG. 5 shows a rotary lobe pump 1, which has a drive device 80_a_. The drive device 80_a_ is connected to a synchronisation gear 90. Two drive shafts 13_a_, 13_b_ are driven by the synchronisation gear 90, which rotate in opposite directions about the axes of rotation 100_a_ and 100_b_. Furthermore, in this embodiment, the components are essentially arranged as in the embodiment shown in FIG. 2.

Figure 6:
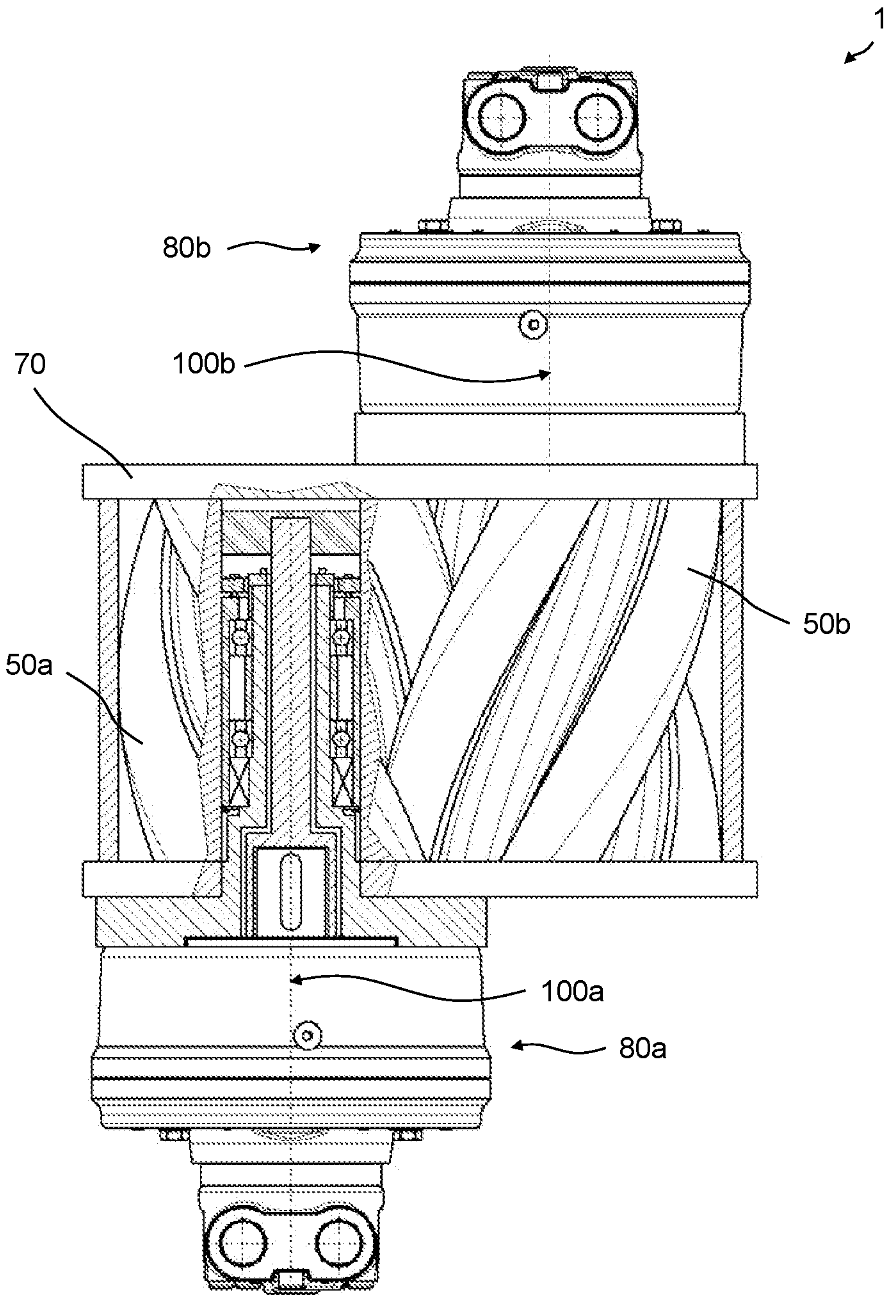
FIG. 6 is a side view of a sixth embodiment with two drive devices on opposite sides, shown with a partial section through the first axis of rotation in the area of the first rotary piston.

FIG. 6 shows a rotary lobe pump 1, wherein two drive devices 80_a_, 80_b_ are arranged on opposite sides of the pump housing 70. Thereby, the first drive device 80_a_ drives the first rotary piston 50_a_, which is mounted rotatably about the axis of rotation 100_a_. Furthermore, the second drive device 80_b_ drives the second rotary piston 50_b_, which is rotatably mounted about the axis of rotation 100_b_. This embodiment allows the use of drive devices with larger diameters than the maximum possible diameters when arranged one above the other on the same side of the pump housing 70.

Figure 7:
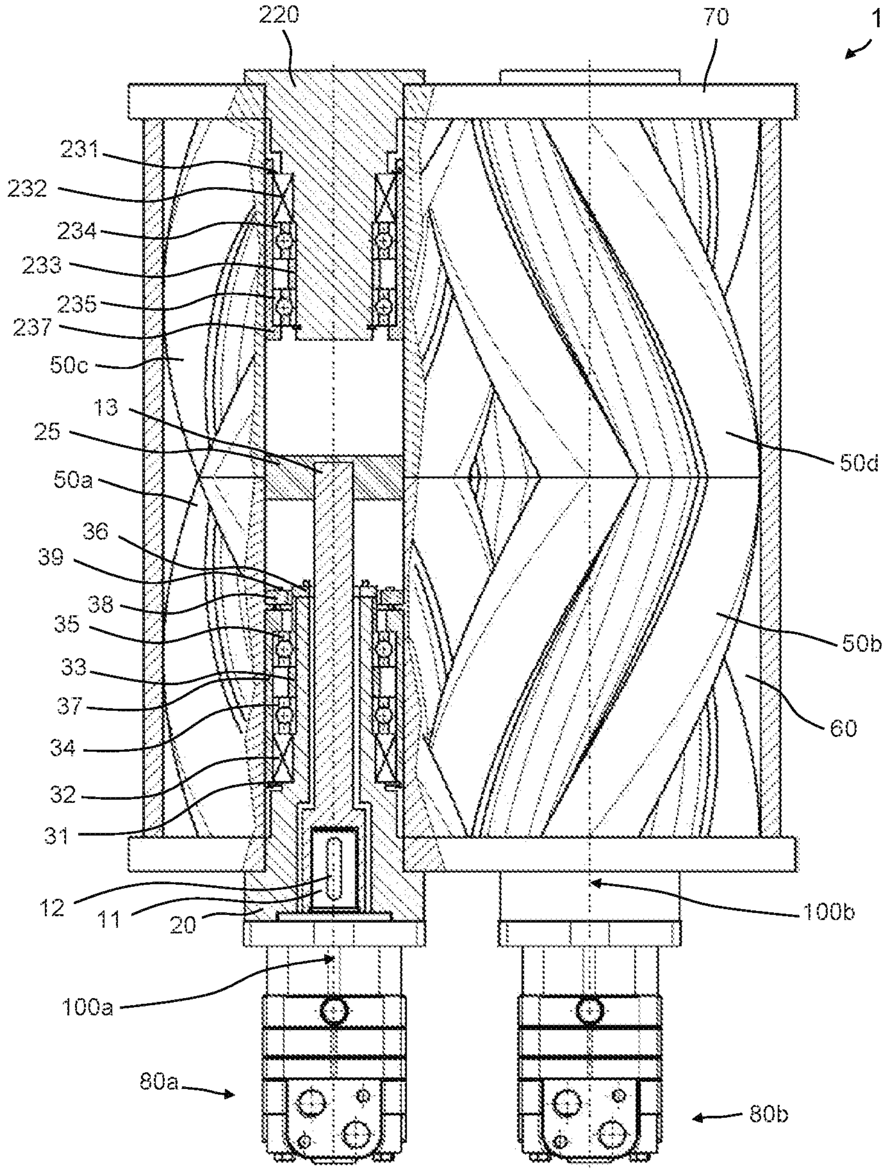
FIG. 7 is a side view of a seventh embodiment with two fixed axle bodies per axis of rotation, shown with a partial section through the first axis of rotation in the area of the first rotary piston.

FIG. 7 shows a rotary lobe pump 1, which has two drive devices 80_a_, 80_b_. Thereby, the drive device 80_a_ is connected to the fixed axle body 20 and the fixed axle body 20 is connected to the pump housing 70. The drive device 80_a_ has a shaft 11, which is connected by means of a shaft-hub connection 12 to the drive shaft 13, which extends through the fixed axle body 20 along the first axis of rotation 100_a_. The drive shaft 13 is thereby connected to the rotary pistons 50_a_ and 50_c_ by means of a shaft-hub connection 25, and thereby transmits a torque from the drive device to this rotary piston. The rotary pistons 50_a_ and 50_c_ are thereby connected to each other in such a way that their end faces rest against each other and the connection is designed tight. This applies analogously to the rotary pistons 50_b_ and 50_d_, which are driven by the drive device 80_b_ and are mounted rotatably about the axis of rotation 100_b_. The rotary pistons 50_a_ and 50_c_ are arranged along the axis of rotation 100_a_ in such a way that the directions of rotation of the twists of the lobes have opposite directions of rotation. The rotary pistons 50_b_ and 50_d_ are also arranged along the axis of rotation 100_b_ in such a way that the directions of rotation of the twists of the lobes have opposite directions of rotation. In addition to the fixed axle body 20, another fixed axle body 220 is connected to the pump housing 70 along the axis of rotation 100_a_ on the opposite side of the pump room 60. This fixed axle body 220 is designed as a solid material component. The rotary piston 50_c_ is rotatably mounted around the fixed axle body 220. This bearing is thereby arranged with a first rolling bearing 234 and a second rolling bearing 235 and a spacer sleeve 233 arranged in between on the second fixed axle body 220. The outer ring of the bearings 234, 235 is connected to a sleeve 237, which is arranged inside the rotary piston 50_c_ and connected to it. Next to the bearing 234, a dynamic seal 232 is arranged on the second fixed axle body 220 to seal the bearing against the pump room 60. The dynamic seal 232 is secured by a retaining ring 231, which is placed in the sleeve 237.

Figure 8:
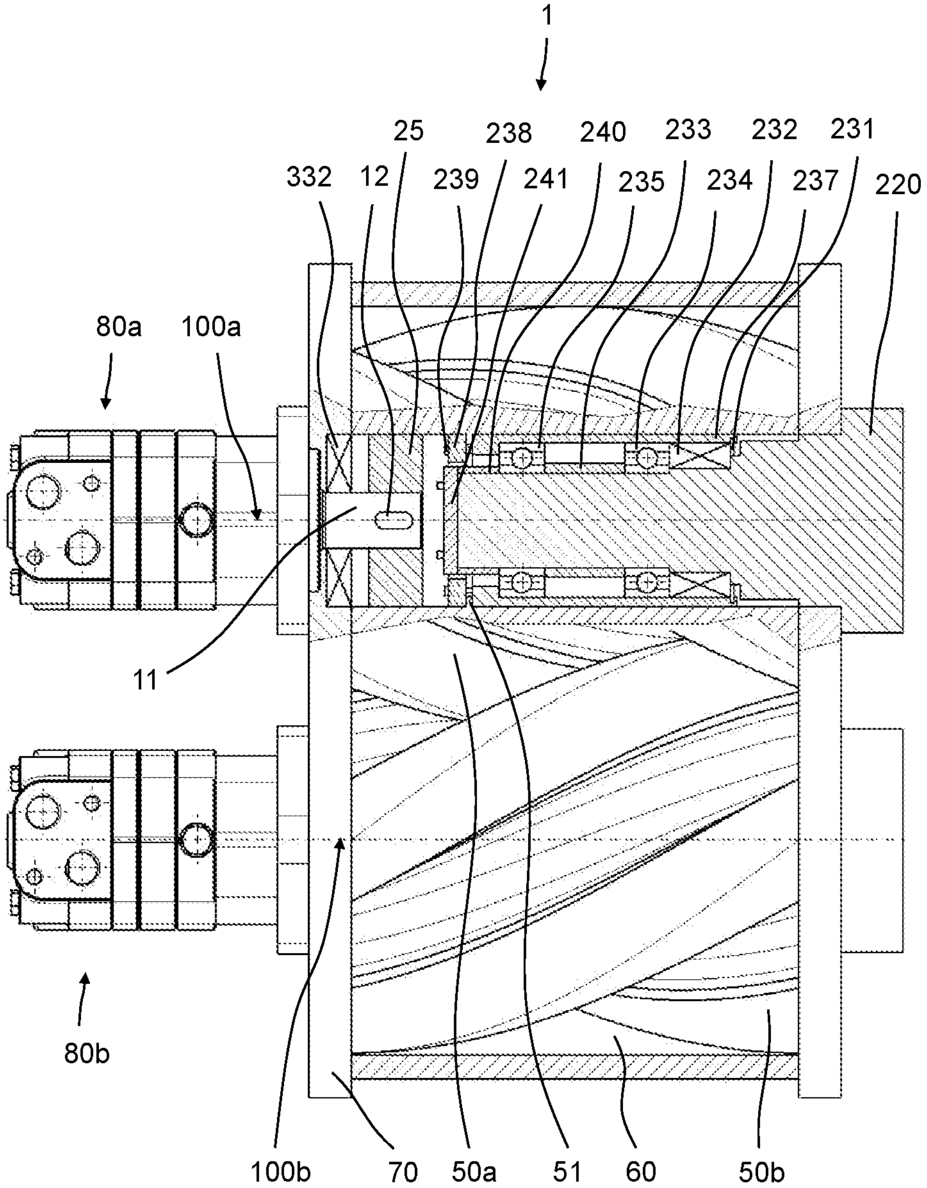
FIG. 8 is a side view of an eighth embodiment with an alternative arrangement of the fixed axle body, shown with a partial section through the first axis of rotation in the area of the first rotary piston.

FIG. 8 shows a rotary lobe pump 1, in which the fixed axle body 220 is made of solid material and is arranged in the pump room 60. Thereby, the fixed axle body 220 is connected to the pump housing 70 on the side opposite to the drive device 80_a_. The drive device 80_a_ has a shaft 11, which is connected to the first rotary piston 50_a_ by means of a shaft-hub connection 12, 25. The first rotary piston 50_a_ is thereby rotatably mounted about the first axis of rotation 100_a_. A dynamic seal 332 is arranged on the shaft 11 at the pump housing 70. Two bearings 235, 234 and a dynamic seal 232 are arranged on the fixed axle body 220, wherein the bearings are kept apart by a spacer sleeve 233. The seal 232 is axially fixed with a retaining ring 231 that is placed in the sleeve 237 surrounding the bearings and the seal. The sleeve 233 is connected to the outer rings of the bearings 235, 234 and to the first rotary piston 50_a_. The sleeve 233 is clamped against a shoulder 51 within the first rotary piston 50_a_ by means of a clamping device 238, wherein the clamping device 238 comprising a plurality of screws 239. The bearing 235 is positioned on the fixed axle body 220 by means of a second spacer sleeve 240. The second spacer sleeve 240 is thereby secured on the fixed axle body 220 by a fastening device 241.

The invention claimed is:

1. A rotary lobe pump for conveying a particle-laden conveyed liquid, comprising:

a pump housing with a pump room;

an inlet opening and an outlet opening;

a first, multi-lobe rotary piston, which is arranged in the pump room and is rotatably mounted about a first axis of rotation;

a second multi-lobe rotary piston, which is arranged in the pump room, and is rotatably mounted about a second axis of rotation spaced apart from the first axis of rotation and meshingly engages in the first rotary piston;

wherein the first and the second rotary pistons are drivable in opposite directions and are designed to generate a flow of the conveyed liquid from the inlet opening through the pump room to the outlet opening by counter-rotation about the first and second axis of rotation, respectively;

a drive device arranged on one side of the pump housing, which is mechanically coupled to at least one of the first or second rotary pistons for driving the at least one of the first or second rotary pistons;

a first fixed axle body, which is arranged inside the first rotary piston and connected to the pump housing on the side of the drive device; and at least one first bearing for rotably supporting the first rotary piston about the first fixed axle body, wherein the bearing is arranged on an outer surface of the first fixed axle body and inside the first rotary piston;

wherein the drive device comprises a first drive unit and a second drive unit; and wherein the first rotary piston is directly coupled to the first drive unit and the second rotary piston is directly coupled to the second drive unit.

2. The rotary lobe pump according to claim 1, wherein: the first fixed axle body extends along the first axis of rotation;

the first rotary piston extends from a first end face of the first rotary piston in axial direction to a second end face along the first axis of rotation; and the at least one first bearing is arranged axially with respect to the first axis of rotation between the first and second end face of the first rotary piston.

3. The rotary lobe pump according to claim 1, wherein the first bearing is a rolling bearing.

4. The rotary lobe pump according to claim 1, including:

a second bearing provided for rotatably supporting the first rotary piston about the first axis of rotation; and wherein the second bearing is arranged on the outer surface of the first fixed axle body and inside the first rotary piston.

5. The rotary lobe pump according to claim 1, wherein:

the first and the second rotary piston each have a number of N lobes, wherein N is greater than or equal to two, and the lobes of the first and the second rotary piston extend helically along the circumferential surface of the rotary piston and thereby sweep an angle of at least 180° divided by N.

6. The rotary lobe pump according to claim 1, wherein:

the first and the second rotary piston each have a number of N lobes, wherein N is less than or equal to eight.

7. The rotary lobe pump according to including:

a shaft-hub connection, for transmitting a torque, which connects the first drive shaft and the first rotary piston in a torque-proof manner.

8. A rotary lobe pump for conveying a particle-laden conveyed liquid, comprising:

a pump housing with a pump room;

an inlet opening and an outlet opening;

a first, multi-lobe rotary piston, which is arranged in the pump room and is rotatably mounted about a first axis of rotation;

a second multi-lobe rotary piston, which is arranged in the pump room, and is rotatably mounted about a second axis of rotation spaced apart from the first axis of rotation and meshingly engages in the first rotary piston;

wherein the first and the second rotary pistons are drivable in opposite directions and are designed to generate a flow of the conveyed liquid from the inlet opening through the pump room to the outlet opening by counter-rotation about the first and second axis of rotation, respectively;

a drive device arranged on one side of the pump housing, which is mechanically coupled to at least one of the first or second rotary pistons for driving the at least one of the first or second rotary pistons;

a first fixed axle body, which is arranged inside the first rotary piston and connected to the pump housing on the side of the drive device; and at least one first bearing for rotably supporting the first rotary piston about the first fixed axle body, wherein the bearing is arranged on an outer surface of the first fixed axle body and inside the first rotary piston;

a second bearing provided for rotatably supporting the first rotary piston about the first axis of rotation;

wherein the second bearing is arranged on the outer surface of the first fixed axle body and inside the first rotary piston; and a first seal for sealing from the first and/or the second bearing to the pump room, arranged between the first fixed axle body and the first rotary piston inside the first rotary piston;

wherein the first seal is a dynamic seal.

9. A rotary lobe pump for conveying a particle-laden conveyed liquid, comprising:

a pump housing with a pump room;

an inlet opening and an outlet opening;

a first, multi-lobe rotary piston, which is arranged in the pump room and is rotatably mounted about a first axis of rotation;

a second multi-lobe rotary piston, which is arranged in the pump room, and is rotatably mounted about a second axis of rotation spaced apart from the first axis of rotation and meshingly engages in the first rotary piston;

wherein the first and the second rotary pistons are drivable in opposite directions and are designed to generate a flow of the conveyed liquid from the inlet opening through the pump room to the outlet opening by counter-rotation about the first and second axis of rotation, respectively;

a first drive device arranged on one side of the pump housing which is mechanically coupled to the first rotary piston for driving the first rotary piston;

a first fixed axle body, which is arranged inside the first rotary piston and connected to the pump housing on the side of the first drive device; and a seal arranged on the first fixed axle body inside the first rotary piston, at least one first bearing includes two bearings for rotatably supporting the first rotary piston about the first fixed axle body, wherein the two bearings are each arranged on an outer surface of the first fixed axle body and inside the first rotary piston, wherein one of the two bearings engages the seal; and a second drive device mechanically coupled to the second rotary piston for driving the second rotary piston.

* * * * *